(12) United States Patent
Imamura

(10) Patent No.: US 6,654,258 B2
(45) Date of Patent: Nov. 25, 2003

(54) RESONANT POWER SUPPLY CIRCUIT

(75) Inventor: Nobuaki Imamura, Omihachiman (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 181 days.

(21) Appl. No.: 10/012,520

(22) Filed: Dec. 12, 2001

(65) Prior Publication Data

US 2003/0095420 A1 May 22, 2003

(30) Foreign Application Priority Data

Dec. 28, 2000 (JP) ........................................ 2000-401347

(51) Int. Cl.[7] ............................................... H02M 3/335
(52) U.S. Cl. .................................. 363/21.02; 363/21.12
(58) Field of Search ............................... 363/16, 21.12, 363/21.13, 21.02, 95, 97, 131

(56) References Cited

U.S. PATENT DOCUMENTS

| | | | | |
|---|---|---|---|---|
| 4,281,372 A | * | 7/1981 | Kornrumpf | ................... 363/20 |
| 4,926,304 A | | 5/1990 | Marinus | |
| 5,177,675 A | * | 1/1993 | Archer | ........................ 363/25 |
| 6,018,467 A | * | 1/2000 | Majid et al. | ................... 363/16 |
| 6,087,782 A | * | 7/2000 | Majid et al. | ................. 315/224 |
| 6,137,698 A | * | 10/2000 | Yukawa et al. | ................ 363/25 |
| 6,341,073 B1 | * | 1/2002 | Lee | .......................... 363/21.02 |
| 6,445,600 B2 | * | 9/2002 | Ben-Yaakov | .................. 363/39 |

FOREIGN PATENT DOCUMENTS

JP        08-149327        6/1996

* cited by examiner

*Primary Examiner*—Adolf D. Berhane
(74) *Attorney, Agent, or Firm*—Keating & Bennett, LLP

(57) ABSTRACT

A resonant power supply circuit includes a flyback transformer. A first FET and a power supply are connected to a primary winding of the flyback transformer. A resonant capacitor and a damper diode are connected between the drain and the source of the first FET. A clamping circuit that includes a diode and a second FET is connected in parallel to the primary winding of the flyback transformer. A control circuit controls the first FET and the second FET. After a flyback pulse is generated, the second FET is turned ON. After the second FET is turned OFF, the first FET is turned ON. When T represents a period of a ringing pulse that is generated after the second FET is turned OFF, the first FET is turned ON after a period of approximately (3T/4) elapses from the time that the second FET is turned OFF.

12 Claims, 9 Drawing Sheets

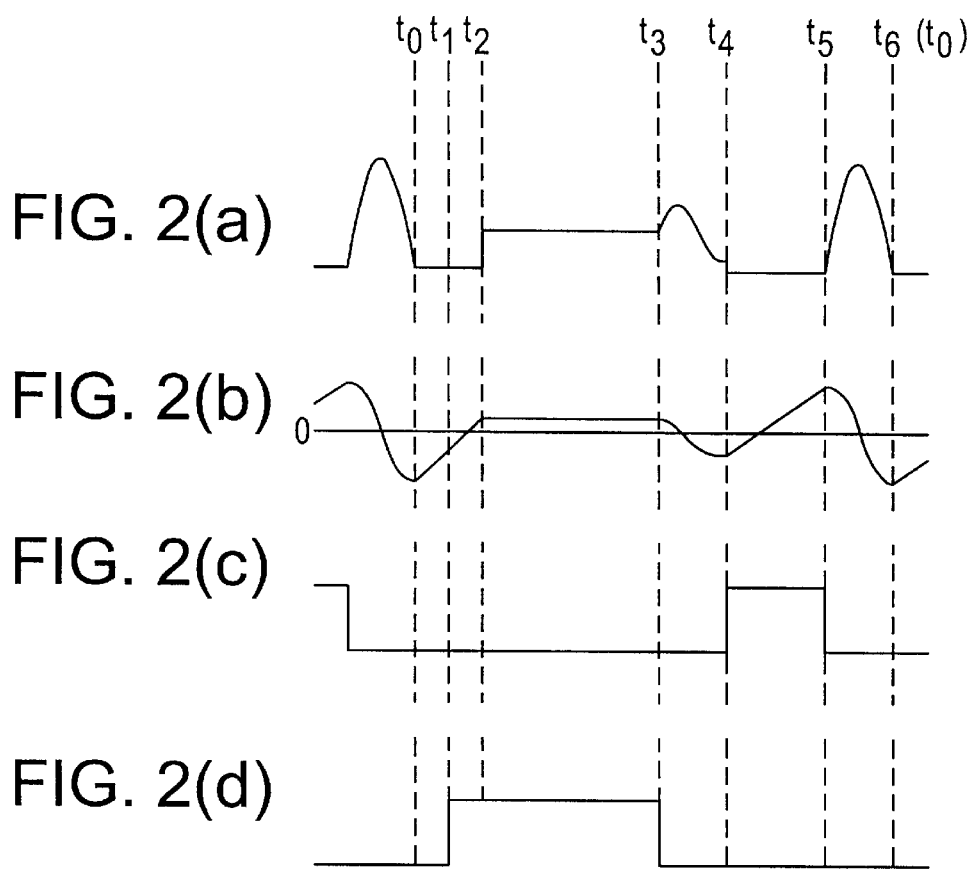
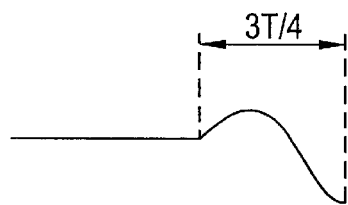
FIG. 3

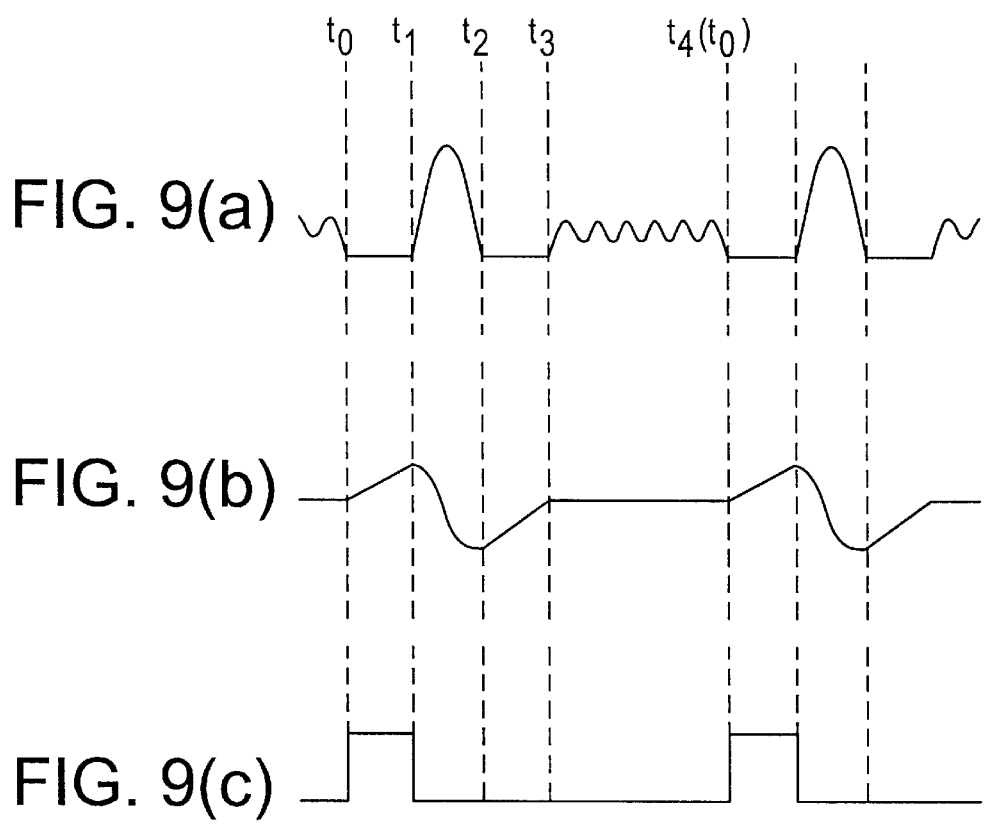

RESONANT POWER SUPPLY CIRCUIT

BACKGROUND OF THE INVENTION

1. Field of the Invention

The present invention relates to resonant power supply circuits, and more particularly, the present invention relates to a resonant power supply circuit for generating a high voltage to be supplied to a cathode ray tube (CRT) or other electronic apparatus.

2. Description of the Related Art

FIG. 8 shows an example of a resonant power supply circuit related to the present invention. A resonant power supply circuit 10 includes a flyback transformer 12. The drain of a field-effect transistor (FET) 14 functioning as a switching device is connected to a first end of a primary winding of the flyback transformer 12, which has a source that is grounded. Between the drain and the source of the FET 14, a resonant capacitor 16 and a damper diode 18 are connected in parallel. The anode of the damper diode 18 is connected to the source side of the FET 14, and the cathode is connected to the drain side of the FET 14. A second end of the primary winding of the flyback transformer 12 is connected to a power supply 20.

A secondary winding of the flyback transformer 12 is connected to a voltage divider circuit 24 through a diode 22. A signal having a voltage that is divided by the voltage divider circuit 24 is input to a control circuit 26, thus generating a control signal to be input to the gate of the FET 14.

FIG. 9 shows waveforms of signals at sections of the resonant power supply circuit 10. Specifically, trace (a) shows the waveform of a voltage at point A in FIG. 8; trace (b) shows the waveform of a current in the primary winding of the flyback transformer 12; and trace (c) shows the waveform of a signal for controlling the FET 14. When the FET 14 is turned ON at $t_0$, current flows from the power supply 20 to the primary winding of the flyback transformer 12 and the FET 14. As a result of the current, electromagnetic energy is stored in the primary winding of the flyback transformer 12.

When the FET 14 is turned OFF at $t_1$, current flows from the primary winding of the flyback transformer 12 to the resonant capacitor 16, thus causing the primary winding of the flyback transformer 12 and the resonant capacitor 16 to resonate with each other. As a result, as shown in trace (a) in FIG. 9, a flyback pulse is generated. The flyback pulse reaches a maximum value when the entire electromagnetic energy stored in the flyback transformer 12 is converted into electrostatic energy in the resonant capacitor 16.

When the flyback pulse reaches the maximum value, the electrostatic energy in the resonant capacitor 16 is inversely converted into electromagnetic energy in the primary winding of the flyback transformer 12, and the voltage of the flyback pulse decreases. When the flyback pulse becomes zero at $t_2$, the damper diode 18 is turned ON, thus causing current to flow from the ground side to the primary winding of the flyback transformer 12. When the voltage at point A recovers to the voltage of the power supply 20, the damper diode 18 is turned OFF, and the current becomes zero. When the FET 14 is turned ON at $t_4$, current flows from the power supply 20 to the primary winding of the flyback transformer 12, thus returning to the initial state at $t_0$. The operation as described above is repeated to maintain the circuit operation. The flyback pulse is boosted by the flyback transformer 12, which results in outputting a high voltage from the secondary winding.

At $t_3$ in which current becomes zero, resonance with the primary winding of the flyback transformer 12 occurs due to the capacity of the resonant capacitor 16 and parasitic capacity in the FET 14. Between $t_3$ to $t_4$, a ringing pulse is generated. Such a ringing pulse causes noise. In order to prevent the generation of a ringing pulse, as shown in FIG. 1 that illustrates another related art device, a clamping circuit 28 is provided. When a ringing pulse starts to be generated, the clamping circuit 28 causes both ends of the primary winding of the flyback transformer 12 to have the same voltage, thus preventing resonance.

The clamping circuit 28 is defined by a series circuit including a diode 30 and an FET 32 that functions as a second switching device. The clamping circuit 28 is connected in parallel to the primary winding of the flyback transformer 12. The operation of the FET 32 is controlled by the control circuit 26.

Referring to FIG. 10, a control method includes a method of simultaneously turning ON the first FET 14 and the second FET 32, the first FET 14 functioning as the first switching device for generating a flyback pulse and the second FET 32 functioning as the second switching device used in the clamping circuit 28, when the voltage at point A is zero. After the first FET 14 is turned OFF, the second FET 32 is turned OFF.

According to this method, the second FET 32 is turned ON to cause both ends of the primary winding of the flyback transformer 12 to have the same voltage. Even when the first FET 14 is turned ON and current flows through the primary winding, the voltage at point A remains at zero. When the first FET 14 is turned OFF and electromagnetic energy in the primary winding of the flyback transformer 12 is converted into electrostatic energy in the resonant capacitor 16, the voltage at point A becomes equal to the voltage of the power supply 20. When the second FET 32 is turned OFF, a flyback pulse is generated.

According to the control method as described above, the first FET 14 can be operated when the voltage at point A is zero, thus preventing the generation of a ringing pulse. When the first FET 14 is turned OFF, current flowing through the primary winding of the flyback transformer 12 reaches its maximum level. This current flows backward by a route passing through the diode 30 and the second FET 32. A circuit loss caused by the backflow is greater than that in a case in which no clamping circuit is provided.

FIG. 11 shows another control method. According to this method, the second FET 32 is turned ON when the voltage at point A is zero. In this state, when current in the primary winding of the flyback transformer 12 becomes zero, the voltage at point A becomes equal to that of the power supply 20 because the voltages at both ends of the primary winding are clamped. After the first FET 14 is turned ON, the second FET 32 is turned OFF.

According to the control method as described above, while backflow current as shown in FIG. 10 is eliminated, a large switching loss is caused since the first FET 14 is turned ON at the same time the voltage at point A becomes equal to that of the power supply 20. Although a voltage ripple is suppressed, current noise is generated. Such current noise in turn generates screen noise in a CRT and causes an increase in temperature of a flyback transformer. It is thus necessary to provide a damping circuit to remove the current noise. In such a case, a considerably great loss is caused in the damping circuit.

SUMMARY OF THE INVENTION

In order to solve the problems described above, preferred embodiments of the present invention provide a resonant power supply circuit that effectively minimizes a circuit loss and noise.

According to a preferred embodiment of the present invention, a resonant power supply circuit includes a flyback transformer, a power supply for supplying power to a primary winding of the flyback transformer, a first switching device for controlling current which flows from the power supply to the primary winding of the flyback transformer, a resonant capacitor for generating a flyback pulse by resonating with the primary winding of the flyback transformer when the first switching device is OFF, and a clamping circuit including a diode and a second switching device which is connected in parallel with the primary winding of the flyback transformer, whereby the voltage between both ends of the primary winding of the flyback transformer is clamped. When T represents a period of a ringing pulse which is generated after the second switching device is turned OFF, the first switching device is turned ON after a period ranging from about $\{(n+\frac{1}{2})T\}$ to about $\{(n+1)T\}$ (where n is zero or a natural number) elapses from the time when the second switching device is turned OFF.

Preferably, the first switching device is turned ON after a period of approximately $\{(n+\frac{3}{4})T\}$ (where n is zero or a natural number) elapses from the time when the second switching device is turned OFF.

More preferably, the first switching device is turned ON after a period of approximately $(3T/4)$ elapses from the time when the second switching device is turned OFF.

By turning ON the second switching device of the clamping circuit which is connected in parallel to the primary winding of the flyback transformer, the voltages at both ends of the primary winding are clamped, thus preventing the generation of a ringing pulse.

A ringing pulse is generated by turning ON the second switching device. If T represents a period of the ringing pulse, the voltage level of the ringing pulse is low in a period ranging from approximately $\{(n+\frac{1}{2})T\}$ to approximately $\{(n+1)T\}$. By turning ON the first switching device within this period, the generation of current oscillation is minimized.

In particular, the position of approximately $\{(n+\frac{3}{4})T\}$ is the lowest level of the ringing pulse. By turning ON the first switching device at this position, the generation of current oscillation is prevented.

By turning ON the first switching device at n=0, that is, after a period of approximately 3T/4 elapses from the time when the second switching device is turned OFF, the first switching device can be turned ON at the lowest level of a first ringing pulse. Since the ringing pulse does not continue for a long period of time, the ON-time of the first switching device can be increased. By adjusting the ON-time of the first switching device, a high output voltage of the flyback transformer can be adjusted.

According to preferred embodiments of the present invention, a resonant power supply circuit is controlled so that a first switching device is turned ON after a predetermined period of time disclosed above elapses from the time when a second switching device is turned OFF, thus minimizing circuit loss and noise generation. Since less noise is generated, a CRT screen is not affected. This eliminates the necessity for a damping circuit for suppressing noise.

Other features, elements, steps, characteristics and advantages of the present invention will become apparent from the following detailed description of preferred embodiments with reference to the attached drawings.

BRIEF DESCRIPTION OF THE DRAWINGS

FIG. 2 includes waveform diagrams of signals at sections of the resonant power supply circuit according to a preferred embodiment of the present invention;

FIG. 3 is a waveform diagram showing the relationship between a ringing pulse and timing of turning ON a first switching device in the resonant power supply circuit according to a preferred embodiment of the present invention;

FIG. 9 includes waveform diagrams of signals at sections in the related resonant power supply circuit shown in FIG. 8;

DETAILED DESCRIPTION OF PREFERRED EMBODIMENTS

Figure 1:
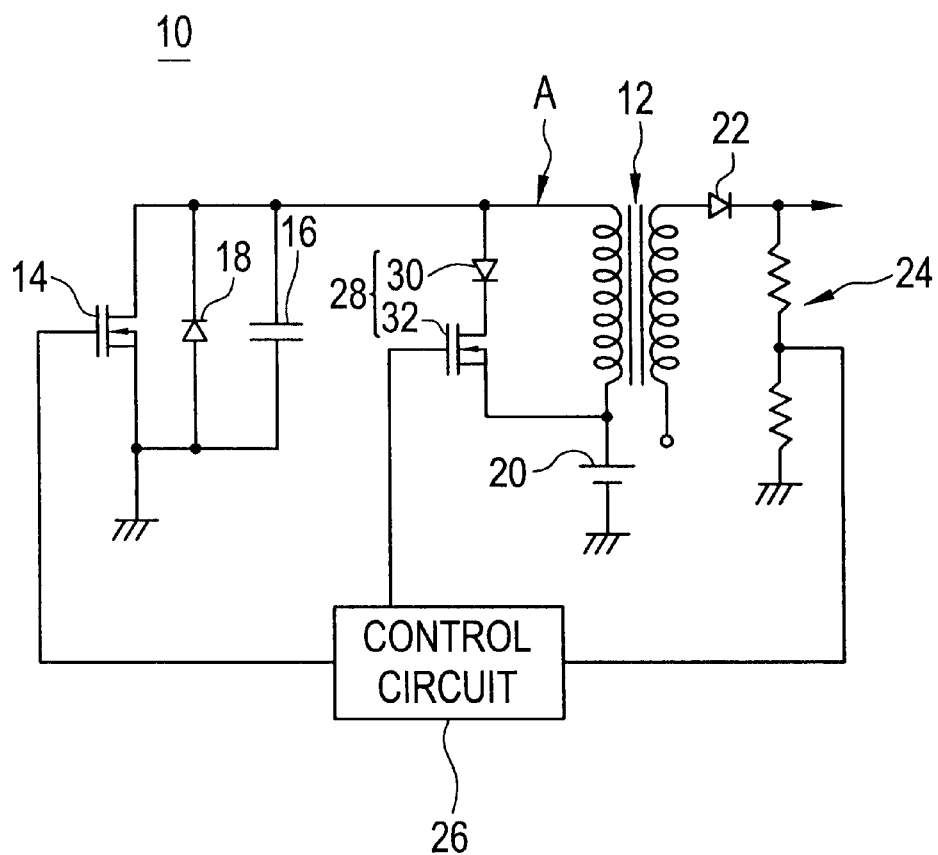
FIG. 1 is a circuit diagram of a resonant power supply circuit related to the present invention.

In the resonant power supply circuit 10, a first FET 14 and a second FET 32 are controlled as illustrated in FIG. 2. Referring to FIG. 2, trace (a) shows a voltage at point A in FIG. 1; trace (b) shows a current in a primary winding of a flyback transformer 12; trace (c) shows a signal for controlling the first FET 14; and trace (d) shows a signal for controlling the second FET 32.

At $t_0$, a flyback pulse ends. At $t_1$, the second FET 32 is turned ON. The voltage at point A remains at zero from the end of the flyback pulse to the power-OFF of a damper diode 18. When the second FET 32 is turned ON before the damper diode 18 is turned OFF, a similar effect is produced. Subsequently, since the second FET 32 is in the ON state at $t_2$, the voltages at both ends of the primary winding of the flyback transformer 12 are clamped to the voltage of a power supply 20. Without a clamping circuit 28, a free oscillation generates voltage oscillation between the primary winding of the flyback transformer 12 and a resonant capacitor 16 or stray capacity. Since the voltage at point A is clamped to the power supply voltage by the clamping circuit, the generation of a ringing pulse is prevented. Since current flowing through the primary winding of the flyback transformer 12 is extremely low, a circuit loss is minimal.

In such a state, the second FET 32 is turned OFF at $t_3$, thus causing the clamping state to be released. This generates a ringing pulse of the voltage at point A. In response to the ringing pulse, current flows through the primary winding of the flyback transformer 12. If T represents a period of the ringing pulse, the first FET 14 is turned ON (at T₄) when a period of approximately (3T/4) elapses from the time the second FET 32 is turned OFF. Accordingly, current flows from the power supply 20 to the primary winding of the flyback transformer 12, and electromagnetic energy is stored in the primary winding.

Subsequently, when the first FET 14 is turned OFF at t₅, the electromagnetic energy stored in the primary winding of the flyback transformer 12 is converted into electrostatic energy in the resonant capacitor 16. At the same time, a flyback pulse is generated. When the entire electromagnetic energy is converted into electrostatic energy, the voltage of the flyback pulse reaches its maximum level. When the flyback pulse ends at t₆, the electrostatic energy stored in the resonant capacitor 16 is again converted into electromagnetic energy in the primary winding of the flyback transformer 12. The state returns to the initial state t₀. When the flyback pulse becomes zero, the damper diode 18 is turned ON, thus causing current to flow from the ground side to the primary winding of the flyback transformer 12. At t₁, the second FET 32 is turned ON, and the voltage at point A is clamped to the voltage of the power supply 20. The operation as described above is repeated to generate a flyback pulse. The flyback pulse is boosted, thus outputting a high voltage from a secondary winding of the flyback transformer 12.

The point at which the second FET 32 is turned OFF varies in accordance with a high output voltage of the flyback transformer 12. When a high output voltage is too high, the point at which the second FET 32 is turned OFF moves rightward on the graph. When a high output voltage is too low, the point at which the second FET 32 is turned OFF moves leftward on the graph.

For example, when a high output voltage is too high, the point at which the second FET 32 is turned OFF moves rightward on the graph. Accordingly, the point at which the first FET 14 is turned ON also moves rightward because the first FET 14 is turned ON after a period of approximately (3T/4) elapses from the time the second FET 32 is turned OFF. When the point at which the first FET 14 is turned ON moves rightward on the graph, the ON-time of the first FET 14 is reduced. Since the high output voltage of the flyback transformer 12 corresponds to the ON-time of the first FET 14, the shorter the ON-time of the first FET 14, the lower the high output voltage of the flyback transformer 12 becomes. In contrast, when the high output voltage of the flyback transformer 12 becomes too low, the point at which the second FET 32 is turned OFF moves leftward on the graph. Accordingly, the point at which the first FET 14 is turned ON also moves leftward. Thus, as the ON-time of the first FET 14 increases, so does the high output voltage of the flyback transformer 12.

In the resonant power supply circuit 10, if T represents a period of a ringing pulse, the first FET 14 is turned ON after a period of approximately (3T/4) elapses from the time when the second FET 32 is turned OFF. Phase 0 represents the point at which the second FET 32 is turned OFF. While the voltage at point A is changed from the voltage of the power supply 20 to zero, re-oscillation starts by using current flowing through the resonant capacitor 16 and other distributed capacity as electromotive force, thus generating a ringing pulse. A period $f_R$ of the ringing pulse is expressed as:

$$f_R = 2\pi\sqrt{L_1 \times (C_O + C_{Q1} + C_{Q2} + C_{FBT})} \qquad (1)$$

In equation (1), $L_1$ is the inductance of the primary winding of the flyback transformer 12; $C_O$ is the capacity of the resonant capacitor 16; $C_{Q1}$ is the stray capacity of the first FET 14; $C_{Q2}$ is the stray capacity of the second FET 32; and $C_{FBT}$ is the stray capacity of the flyback transformer 12. The stray capacity $C_{Q2}$ of the second FET 32 contributes to the period of the ringing pulse only when current flows forward (from the drain side to the source side) in the second FET 32. The period of the ringing pulse is determined by inherent characteristics of the components used. The period of the ringing pulse never varies during operation and is constant. Thus, it is easy to control the point at which the first FET 14 is turned ON.

In the resonant power supply circuit 10, if T represents the period of the ringing pulse, the position of (3T/4) is the position of the lowest level of the ringing pulse. Accordingly, the first FET 14 can be turned ON when the voltage at point A reaches its lowest level. The time required for the voltage at point A to change from the voltage of the power supply 20 to zero is very small compared with the ON-time of the first FET 14. Thus, the ringing current is very small compared with the ON-current of the first FET 14. By turning ON the first FET 14 at the lowest voltage level, heating of the FET 14 caused by a switching loss can be prevented. Since current oscillation is prevented, adverse effects such as screen noise in a CRT are prevented.

More specifically, when the ringing pulse is at the lowest voltage level, the voltage level is substantially 0 V. In other words, the voltage across the drain and the source of the first FET 14 is 0 V. This means that a zero-voltage-switch is implemented. As a result, current oscillation caused by turning ON the first FET 14 becomes small. It is thus possible to reduce screen noise and to prevent an increase in temperature of the flyback transformer 12 even when no circuit is used to prevent noise.

Figure 4:
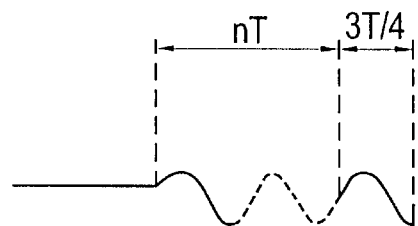
FIG. 4 is a waveform diagram showing another example of the relationship between the ringing pulse and timing of turning ON the first switching device in the resonant power supply circuit according to a preferred embodiment of the present invention.

Alternatively, the first FET 14 can be turned ON after a period of approximately {(n+¾)T} elapses from the time when the second FET 32 is turned OFF. In {(n+¾)T}, n is zero or a natural number. The above-described value of (3T/4) indicates a case when n=0. When n is not zero, as shown in FIG. 4, the first FET 14 is turned ON at the lowest voltage level, that is, when a ringing pulse is repeated n times and an approximate ¾ period passes. Thus, the first FET 14 is reliably turned ON at the lowest voltage level. When the ringing pulse is repeated a plurality of times, the ON-time of the first FET 14 is reduced, thus making the adjustment of the high output voltage difficult. For this reason, it is preferable that n=0.

The voltage level of the ringing pulse is low in the period between T/2 to T which is near 3T/4. By turning ON the first FET 14 within this period, heating of the FET 14 caused by a switching loss and current oscillation can be reduced. In other words, the advantages of preferred embodiments of the present invention can be achieved by turning ON the first FET 14 after a period ranging from about {(n+½)T} to about {(n+1)T} elapses from the time the second FET 32 is turned OFF.

In FIG. 1, the damper diode 18 is connected in parallel to the first FET 14. Since the FET 14 includes a parasitic diode, the parasitic diode can be used instead. When using the parasitic diode in the first FET 14, the damper diode 18 can be omitted.

Even without the clamping circuit including the second FET 32 and other elements, similar advantages can be achieved by turning ON the first FET 14 at the lowest voltage level of the ringing pulse. At present, there is a type of resonant power supply circuit which has the maximum rating set so that the first FET 14 is turned ON at the lowest voltage level of the ringing pulse, thus minimizing loss. In this type of resonant power supply circuit, a change of load or a change in frequency causes the point at which the first FET 14 is turned ON to be shifted from the lowest voltage level of the ringing pulse. It thus becomes necessary to set high thermal tolerances on circuit components, taking into consideration the maximum loss. In contrast, the resonant power supply circuit 10 according to preferred embodiments of the present invention is configured such that the first FET 14 can be reliably turned ON at the lowest voltage level of the ringing pulse by controlling the point at which the second FET 32 is turned OFF and the point at which the first FET 14 is turned ON. This removes the necessity for large thermal tolerances.

Figure 5:
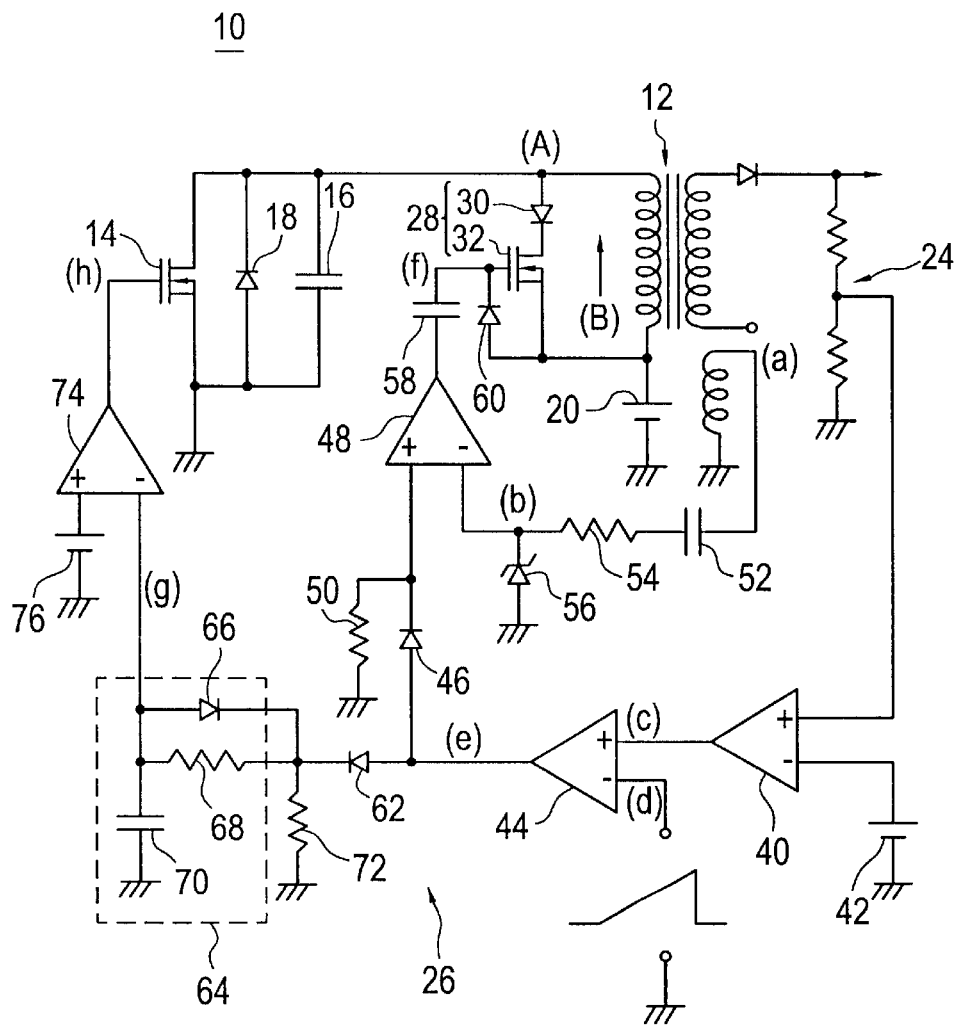
FIG. 5 is a circuit diagram of an example of a control circuit used in the resonant power supply circuit according to a preferred embodiment of the present invention.

An example of the control circuit 26 includes, for example, a circuit as shown in FIG. 5. In the control circuit 26, a voltage divider circuit 24 connected to the secondary winding side of the flyback transformer 12 outputs a signal to a non-inverting input terminal of an operational amplifier 40. A reference voltage is input from a reference supply 42 to an inverting input terminal of the operational amplifier 40. An output terminal of the operational amplifier 40 is connected to a non-inverting input terminal of a comparator 44. A comparison triangular wave is input to an inverting input terminal of the comparator 44.

An output terminal of the comparator 44 is connected through a diode 46 to a non-inverting input terminal of an operational amplifier 48. The non-inverting input terminal of the operational amplifier 48 is grounded through a resistor 50. A tertiary winding of the flyback transformer 12 is connected through a capacitor 52 and a resistor 54 to an inverting input terminal of the operational amplifier 48. A node between the resistor 54 and the inverting input terminal of the operational amplifier 48 is connected to the cathode of a Zener diode 56, which has an anode that is grounded.

An output terminal of the operational amplifier 48 is connected to the gate of the second FET 32 through a capacitor 58. The cathode of a diode 60 is connected to the gate of the second FET 32. The anode of the diode 60 is connected to a node between the primary winding of the flyback transformer 12 and the power supply 20.

Furthermore, the output terminal of the comparator 44 is connected through a diode 62 to a phase shift circuit 64 which contains a diode 66, a resistor 68, and a capacitor 70. An output terminal of the diode 62 is grounded through a resistor 72. The phase shift circuit 64 is connected to an inverting input terminal of an operational amplifier 74. A reference supply 76 is connected to a non-inverting input terminal of the operational amplifier 74. An output terminal of the operational amplifier 74 is connected to the gate of the first FET 14.

Figure 6:
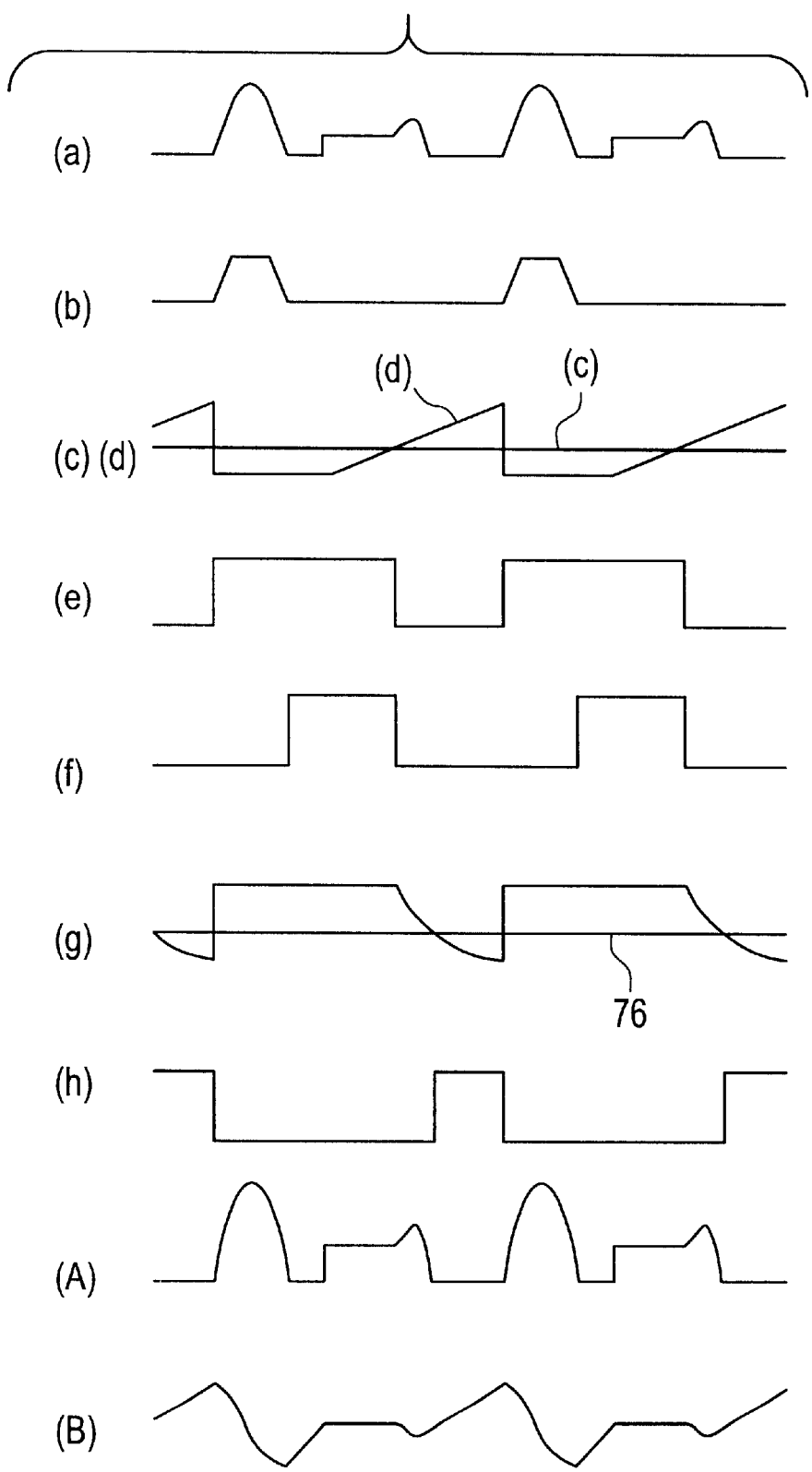
FIG. 6 includes waveform diagrams of signals at sections of the resonant power supply circuit shown in FIG. 5.

FIG. 6 shows waveforms of signals at sections shown in FIG. 5. Referring to FIG. 6, trace (a) shows an output voltage of the tertiary winding of the flyback transformer 12; trace (b) shows an input signal to be input to the inverting input terminal of the operational amplifier 48; trace (c) shows an input signal to be input to the inverting input terminal of the comparator 44; trace (d) shows an input signal to be input to the non-inverting input terminal of the comparator 44; trace (e) shows an output signal from the comparator 44; trace (f) shows an input signal to be input to the gate of the second FET 32; trace (g) shows an input signal to be input to the inverting input terminal of the operational amplifier 74; trace (h) shows an input signal to be input to the gate of the first FET 14; trace (A) shows a voltage at point A; and trace (B) shows a current in the primary winding of the flyback transformer 12.

In the resonant power supply circuit 10, as shown in trace (a) in FIG. 6, the tertiary winding of the flyback transformer 12 outputs a signal which has a waveform similar to that of the voltage at point A. The signal is input to the inverting input terminal of the operational amplifier 48. As shown in trace (b) in FIG. 6, the function of the Zener diode 56 causes only a high voltage portion of the output signal from the tertiary winding to be input to the operational amplifier 48.

In contrast, as shown in trace (c) in FIG. 6, the operational amplifier 40 outputs a difference between the DC voltage produced by the voltage divider circuit 24 and the voltage of the reference supply 42, and the output signal is input to the non-inverting input terminal of the comparator 44. Thus, the operational amplifier 40 outputs a signal having the voltage that corresponds to the output voltage of the secondary winding of the flyback transformer 12. As shown in trace (d) in FIG. 6, the comparison triangular wave is input to the inverting input terminal of the comparator 44. As shown in trace (e) in FIG. 6, when the output signal of the operational amplifier 40 is high compared with the triangular wave input to the inverting input terminal of the comparator 44, the comparator 44 outputs a signal. The comparison triangular wave input to the inverting input terminal of the comparator 44 can be produced by wave-shaping a horizontal drive signal (HD signal).

The output signal of the comparator 44 is input to the non-inverting input terminal of the operational amplifier 48. As shown in trace (f) in FIG. 6, a signal that corresponds to a difference between the signal input to the non-inverting input terminal and a signal input to an inverting input terminal is output. This output signal of the operational amplifier 48 is input to the gate of the second FET 32, thus controlling the second FET 32.

The output signal of the comparator 44 is also input to the phase shift circuit 64. As shown in trace (g) in FIG. 6, the phase shift circuit 64 outputs a signal which gradually falls after the output signal of the comparator 44 enters the OFF state. The operational amplifier 74 compares the output signal of the phase shift circuit 64 with the voltage of the reference supply 76. As shown in trace (h) in FIG. 6, when the output signal of the phase shift circuit 64 is lower than the voltage of the reference supply 76, the operational amplifier 74 outputs a signal. The output signal of the operational amplifier 74 is input to the gate of the first FET 14, thus controlling the first FET 14. When the signal input to the gate of the second FET 32 enters the OFF state, a ringing pulse with a period T is generated. The output signal of the operational amplifier 74 is adjusted to enter the ON state after the control signal for the second FET 32 becomes OFF (after a period of approximately 2T/3 passes).

In this manner, the timing of the operation of the first FET 14 and the second FET 32 is adjusted. As shown in trace (A) in FIG. 6, a voltage waveform that has no ringing pulse can be generated. As shown in trace (B) in FIG. 6, a current waveform that has less noise can be generated, thus minimizing circuit loss.

When the output voltage of the secondary wiring of the flyback transformer 12 becomes high, as shown in traces (c) and (d) in FIG. 6, the output voltage from the operational amplifier 40 becomes high, and the pulse width shown in trace (e) in FIG. 6 increases. As a result, the OFF-point of the signal which is input to the gate of the second FET 32 and which is shown in trace (f) in FIG. 6 moves rightward. Thus, it is adjusted so that the width of the signal which is input to the gate of the first FET 14 and which is shown in trace (h) in FIG. 6 becomes narrow and that the output voltage of the secondary winding of the flyback transformer 12 becomes low. When the output voltage of the secondary winding of the flyback transformer 12 becomes low, the opposite operation is performed to increase the output voltage of the secondary winding.

According to the resonant power supply circuit 10, the second FET 32 is controlled, thus clamping both ends of the primary winding of the flyback transformer 12 and preventing the generation of a ringing pulse. When the second FET 32 is turned OFF and enters re-oscillation mode, a ringing pulse is generated. By adjusting timing of the input of signals to the gates of the first FET 14 and the second FET 32, the first FET 14 can be turned ON at the lowest voltage level of the ringing pulse, thereby preventing the generation of current noise and minimizing circuit loss. Furthermore, screen noise and temperature increase of the flyback transformer 12 are prevented. According to the resonant power supply circuit 10 shown in FIG. 5, although both the first FET 14 and the second FET 32 operate under the pulse-width control, control signals are generated using the common comparator 44. Therefore, circuit simplification can be achieved.

Figure 7:
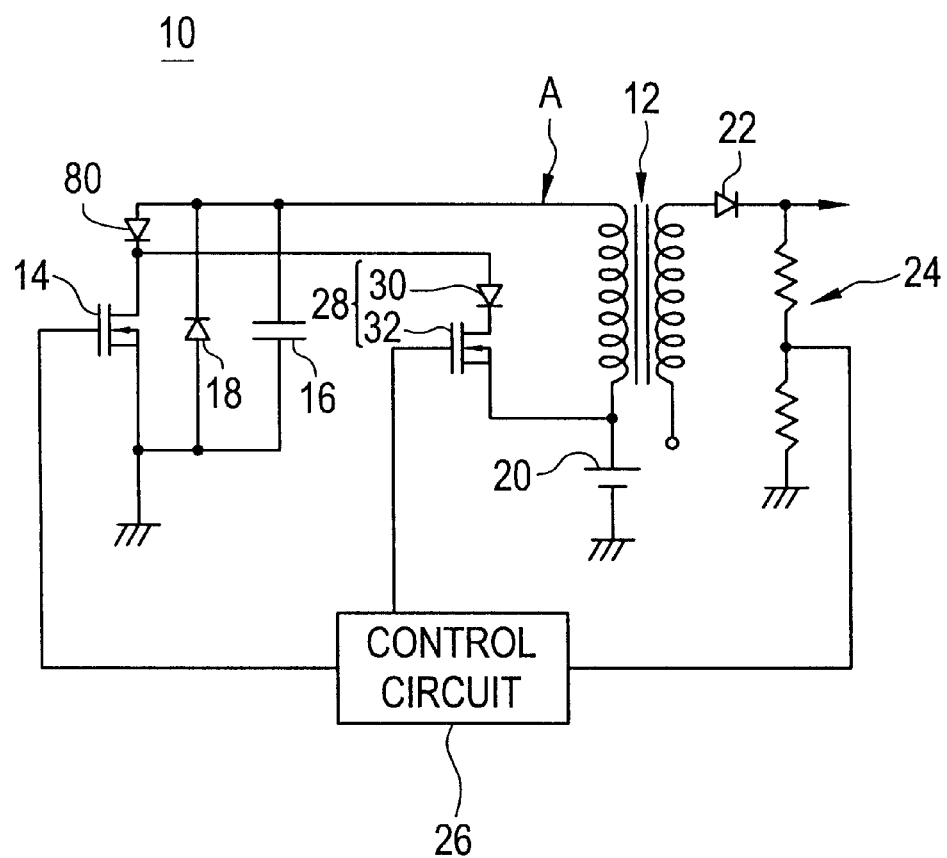
FIG. 7 is a circuit diagram of another example of a resonant power supply circuit according to a preferred embodiment of the present invention.
Figure 8:
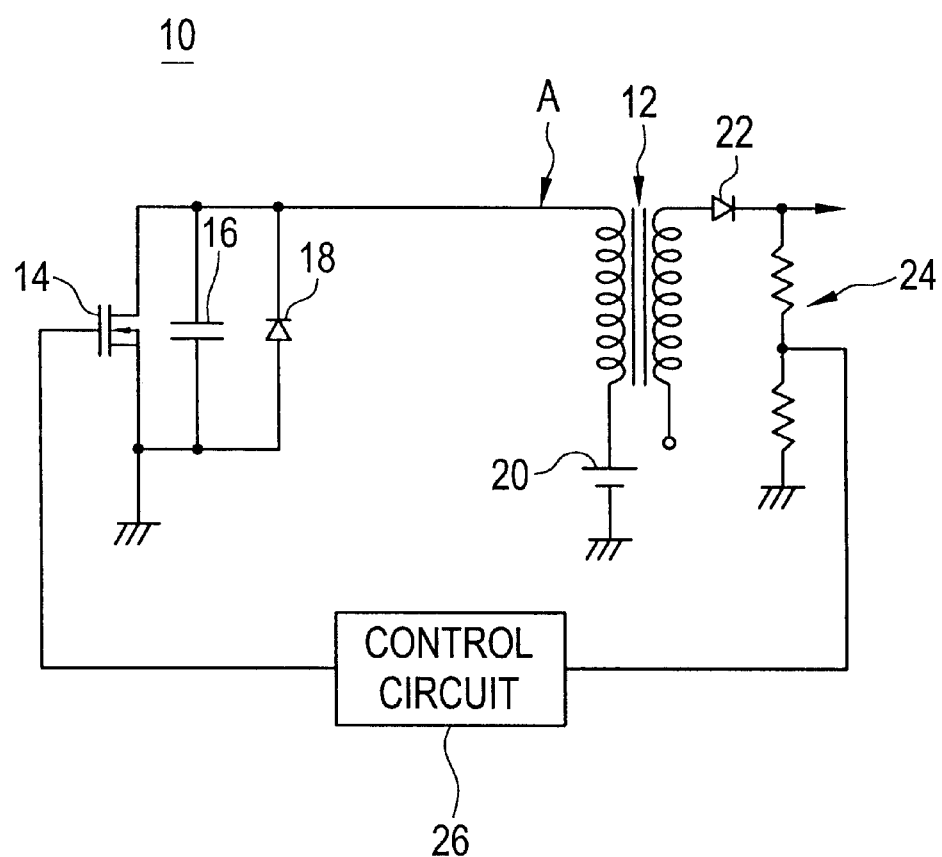
FIG. 8 is a circuit diagram of an example of a related resonant power supply circuit.
Figure 10A:
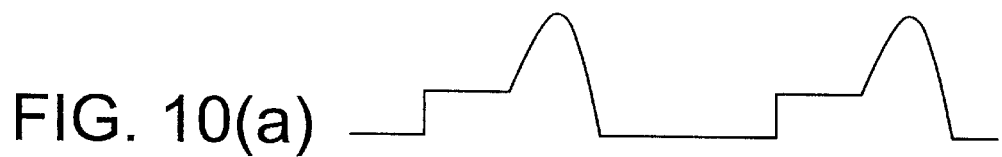
FIG. 10 includes waveform diagrams of examples of signals at sections in the resonant power supply circuit shown in FIG. 1, the signals being produced by a related control method.
Figure 10B:
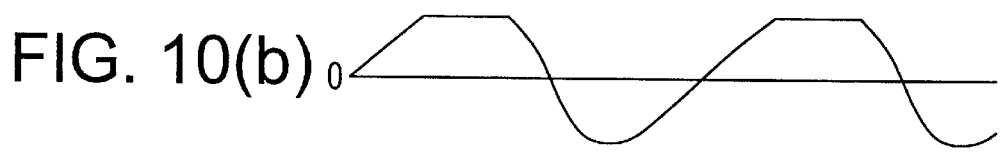
Figure 10C:
Figure 10D:
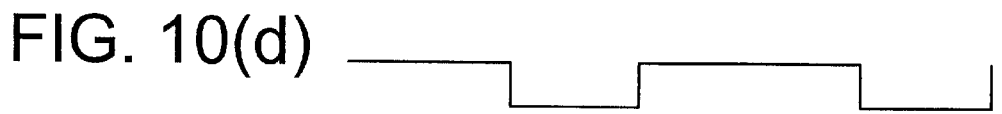
Figure 11A:
FIG. 11 includes waveform diagrams of other examples of signals at the sections in the resonant power supply circuit shown in FIG. 1, the signals being produced by another related control method.
Figure 11B:
Figure 11C:
Figure 11D:
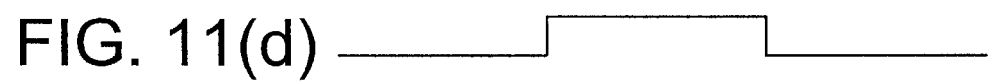

FIG. 7 shows another example of the resonant power supply circuit according to a preferred embodiment of the present invention. In the resonant power supply circuit 10, compared with that shown in FIG. 1, a diode 80 is connected between the primary winding of the flyback transformer 12 and the first FET 14. The anode of the diode 80 is connected to the primary winding of the flyback transformer 12, and the cathode is connected to the drain of the first FET 14. The anode of the diode 30 defining the clamping circuit 28 is connected between the diode 80 and the first FET 14.

According to preferred embodiments of the present invention, when the second FET 32 is turned OFF, it is necessary to generate at least one ringing pulse. When the voltage level of the ringing pulse is too high, screen noise may be caused on a CRT. The voltage level of the ringing pulse is determined based on distributed capacity. By reducing the above-described $C_O$, $C_{Q1}$, $C_{Q2}$, and $C_{FBT}$, the voltage level can be reduced. From among these capacities, only the capacity $C_O$ of the resonant capacitor 16 can be directly controlled. In order to reduce the distributed capacity of the first FET 14, the diode 80 is added, thus reducing the voltage level of the ringing pulse.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A resonant power supply circuit comprising:
    a flyback transformer having a primary winding and a secondary winding;
    a power supply for supplying power to the primary winding of the flyback transformer;
    a first switching device for controlling current which flows from the power supply to the primary winding of the flyback transformer;
    a resonant capacitor for generating a flyback pulse by resonating with the primary winding of the flyback transformer when the first switching device is OFF; and
    a clamping circuit including a diode and a second switching device which is connected in parallel with the primary winding of the flyback transformer, whereby the voltage between both ends of the primary winding of the flyback transformer is clamped;
    wherein, when T represents a period of a ringing pulse which is generated after the second switching device is turned OFF, the first switching device is turned ON after a period ranging from approximately $\{(n+\frac{1}{2})T\}$ to approximately $\{(n+1)T\}$ (where n is zero or a natural number) elapses from the time when the second switching device is turned OFF.

2. A resonant power supply circuit according to claim 1, wherein the first switching device is turned ON after a period of approximately $\{(n+\frac{3}{4})T\}$ (where n is zero or a natural number) elapses from the time the second switching device is turned OFF.

3. A resonant power supply circuit according to claim 2, wherein the first switching device is turned ON after a period of approximately (3T/4) elapses from the time the second switching device is turned OFF.

4. A resonant power supply circuit according to claim 1, wherein the first switching device includes a FET.

5. A resonant power supply circuit according to claim 4, wherein the FET includes a parasitic diode.

6. A resonant power supply circuit according to claim 1, wherein the second switching device includes a FET.

7. A resonant power supply circuit according to claim 1, further comprising a voltage divider circuit connected to the secondary winding of the flyback transformer.

8. A resonant power supply circuit according to claim 1, further comprising a voltage divider circuit connected to the secondary winding of the flyback transformer.

9. A resonant power supply circuit according to claim 6, further comprising a capacitor and an operational amplifier connected to the FET through the capacitor.

10. A resonant power supply circuit according to claim 6, further comprising a diode connected to the FET and connected to a node between the primary winding of the flyback transformer and a power supply.

11. A resonant power supply circuit according to claim 4, further comprising a diode connected between the primary winding of the flyback transformer and the first.

12. A resonant power supply circuit according to claim 11, wherein the diode of the clamping circuit is connected between the diode and the FET.

* * * * *